United States Patent [19]

Bellego et al.

[11] Patent Number: 4,789,119

[45] Date of Patent: Dec. 6, 1988

[54] SYSTEM FOR CONTROLLING THE HIGH-LIFT FLAPS OF AN AIRCRAFT

[75] Inventors: Roger Bellego, Blagnac; Etienne Foch, Toulouse, both of France

[73] Assignee: Aerospatiale Societe Nationale Industrielle, Paris, France

[21] Appl. No.: 117,586

[22] Filed: Nov. 6, 1987

[30] Foreign Application Priority Data

Nov. 7, 1986 [FR] France ............................... 86 15588

[51] Int. Cl.$^4$ .................. B64C 13/10; B64C 13/40
[52] U.S. Cl. ................................. 244/226; 244/75 R; 244/213
[58] Field of Search .................... 244/213, 215, 75 R, 244/226, 78, 227

[56] References Cited

U.S. PATENT DOCUMENTS

| | | | |
|---|---|---|---|
| 2,745,357 | 5/1956 | Strayer | 244/226 |
| 4,143,839 | 3/1979 | Anator et al. | 244/213 |
| 4,441,675 | 4/1984 | Boehringer et al. | 244/213 |

Primary Examiner—Galen Barefoot
Assistant Examiner—Rodney Corl
Attorney, Agent, or Firm—Fisher, Christen & Sabol

[57] ABSTRACT

This invention relates to a system for controlling the high-lift flaps of an aircraft subjected to the blast of at least one engine. The system includes reversible hydraulic jacks for actuating the flaps arranged so that each flap is actuated by a jack and each of the two chambers of one jack are connected to the corresponding chamber of the other jack, as well as to an orifice in a hydraulic fluid distributing unit, so that the supply and exhaust of the corresponding chambers of the jacks are respectively simultaneous. The high-lift flaps are connected by a mechanical torsional connection which allows a dissymetry of position of the high-lift flaps in extended position. A safety system is also provided to block the high-lift flaps in position as soon as the extent of dissymetry of position between the high-lift flaps in extended position reaches a predetermined threshold.

8 Claims, 5 Drawing Sheets

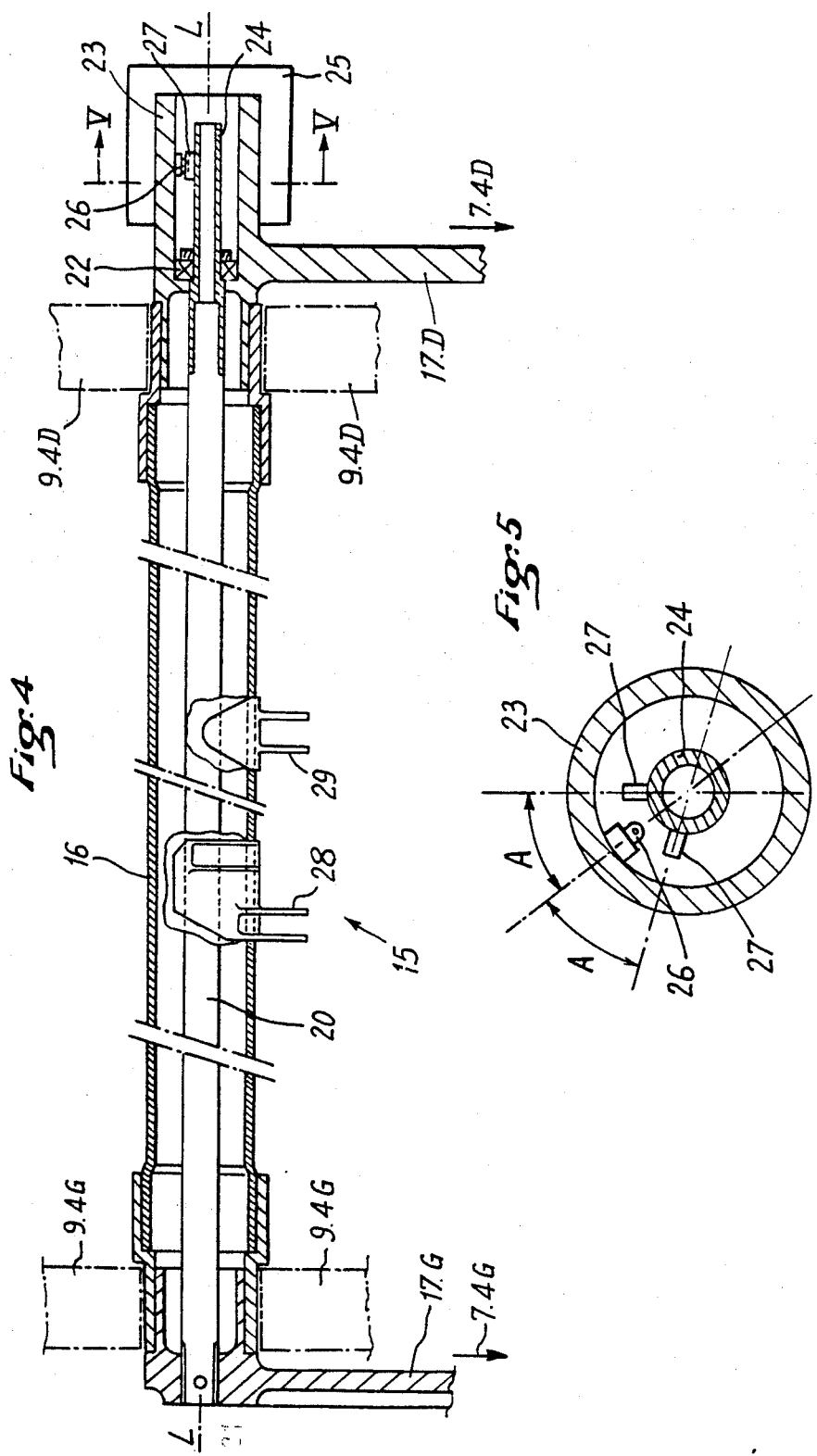

SYSTEM FOR CONTROLLING THE HIGH-LIFT FLAPS OF AN AIRCRAFT

The present invention relates to a system for controlling the high-lift flaps of an aircraft.

In order to increase the lift of an aircraft during certain phases of flight requiring a high lift (such as take-off, runway approach, landing), it is known to provide, particularly in the trailing edge of the wings of this aircraft, high-lift flaps capable of occupying either a retracted or neutral position or an expanded, preferably adjustable position of high-lift.

The additional lift contributed by these high-lift flaps is often further increased as they receive the blast of one or more engines.

However, this latter point presents a serious drawback in that, if one of the engines of the aircraft breaks down when said high-lift flaps are extended, this immediately results in an unbalance of lift between the two sides of said aircraft, likely to cause an excessive roll attitude. This is all the more serious as the aircraft is at that moment in a flight phase close to the ground.

The most wide-spread systems for controlling high-lift flaps comprise a central motor (electric or hydraulic), a load transmission by torque shaft, screw jacks and mechanical irreversibility devices. Unless highly complicated arrangements are made, they do not allow measures capable of re-balancing an unbalanced aircraft following the breakdown of an engine having to blast one or more extended high-lift flaps.

It is an object of the present invention to overcome these drawbacks. It relates to a simple system for controlling the high-lift flaps of an aircraft, on the one hand capable of automatically introducing dissymetrical corrections of lift tending to re-balance said aircraft in the event of breakdown of an aircraft engine during a flight phase in which said high-lift flaps are extended and, on the other hand, comprising protections against its own failures.

To that end, according to the invention, the system for controlling the high-lift flaps of an aircraft comprising two fixed wings, symmetrical to each other with respect to the median horizontal plane of said aircraft and each provided with at least one engine for propulsion and a high-lift flap, each of said flaps being subjected to the blast of at least one engine, said control system comprising:
  a source of hydraulic fluid under pressure;
  a unit for distributing hydraulic fluid connected to said source;
  means for actuating said high-lift flaps controlled by said hydraulic fluid distributing unit;
  a device for controlling said hydraulic fluid distributing unit;
  a voluntary control member, at a pilot's disposal and controlling, via said control device, said hydraulic fluid distributing unit and said actuating means, said high-lift flaps between a retracted neutral position and at least one extended lift-augmenting position, and vice-versa, is noteworthy in that:
    said actuating means are reversible hydraulic jacks, arranged so that each flap is actuated by a jack and each of the two chambers of one jack is connected to the corresponding chamber of the other jack, as well as to an orifice in said hydraulic fluid distributing unit, so that the supply and exhaust of the corresponding chambers of said jacks are respectively simultaneous;
    said high-lift flaps are connected by a mechanical torsional link allowing a dissymetry of position of said high-lift flaps in extended position; and
    means are provided for blocking said high-lift flaps in position, as soon as the dissymetry of position of said high-lift flaps in extended position attains a predetermined threshold.

Owing to the fluid link existing between said jacks, a dissymetry of lift (i.e. of extension) of said flaps may occur, the least loaded flap (i.e. the one disposed towards the engine having failed), tending to retract, whilst the flap disposed towards the engine(s) in operation tends to extend. Such dissymetry is allowed by said mechanical torsional link. However, as soon as this dissymetry risks becoming excessive (i.e. as soon as the torsion of said mechanial link reaches said threshold), to the extent of presenting a danger for the stability of the aircraft, said blocking means limit the dissymetry to an acceptable value.

According to an advantageous embodiment of the invention, said blocking means comprise a switch controlled by the torsion of said mechanical link and controlling said device for controlling said hydraulic distributing unit. However, according to a variant, said blocking means comprise sensors detecting the position of said high-lift flaps, a threshold comparator and a switch controlled by said threshold comparator and controlling said device for controlling said hydraulic fluid distributing unit.

Said mechanical link advantageously comprises a torque shaft which swivels about its axis with respect to the structure of said wings and of which the ends are respectively connected to said flaps via crankpins and connecting rods. In that case, it is advantageous if said torque shaft is connected to said device for controlling said hydraulic fluid distributing unit, in order to transmit to said control device information as to the rotation thereof about its axis, i.e. information on the amplitude of the extended position of said flaps.

When the mechanical link is a torque shaft and the blocking means comprise a switch controlled by the torsion of said shaft, it is advantageous if said mechanical link comprises, in addition, a rod coaxial to said torque shaft and fast in rotation, at one of its ends, with an end of said torque shaft, a system of stop and of contact being disposed between the free end of said rod and the opposite part of said torque shaft.

In the event of an additional outer high-lift flap being provided on each wing of the aircraft, the two flaps of one wing being connected to each other by a mechanical coupling, it is advantageous:
  if said additional outer flaps are respectively actuated by additional reversible hydraulic jacks, arranged so that:
    the chambers of these additional jacks corresponding, when they are supplied with fluid, to the retraction of said additional outer flaps, are connected in common to the corresponding chambers of the jacks associated with the inner flaps and to the first corresponding orifice of said hydraulic fluid distributing unit;
    and the chambers of said additional jacks corresponding, when they are supplied with fluid, to the extension of said additional outer flaps, are connected together and, via a first restrictor, to the second orifice of said hydraulic distributing unit, to which are connected the corresponding chambers of the jacks actuating the inner flaps;

and if a second restrictor is provided between said second orifice of said hydraulic distributing unit and the corresponding chambers of the jacks associated with the inner flaps.

A link is thus established, via the two restrictors, between the circuits for extension of the outer flaps and of the inner flaps. Consequently, in the event of leakage in one of the circuits, there is transfer of fluid from one circuit to the other. Retraction of the flaps is therefore braked and the pilot has the time to take the necessary steps to avoid the risks due to the resulting loss of lift.

The system according to the invention preferably comprises an alarm device triggered off by said control device, when said voluntary control member is in a position corresponding to the extension of said high-lift flaps, whilst rotation of said torque shaft indicates retraction.

The invention will be more readily understood on reading the following description with reference to the accompanying drawings, in which identical references designate like elements. Moreover, when identical elements are associated with particular elements, each of said identical elements bears a reference common to all, given an index constituted by the reference of the corresponding particular element.

In these Figures,

FIG. 1 schematically illustrates in perspective an aircraft likely to be improved according to the invention.

FIG. 4 is an axial longitudinal section of the torsion system ensuring the mechanical link between the two inner high-lift flaps of the two FIG. 5 is a transverse section along line V—V of FIG. 4.

Figure 1:
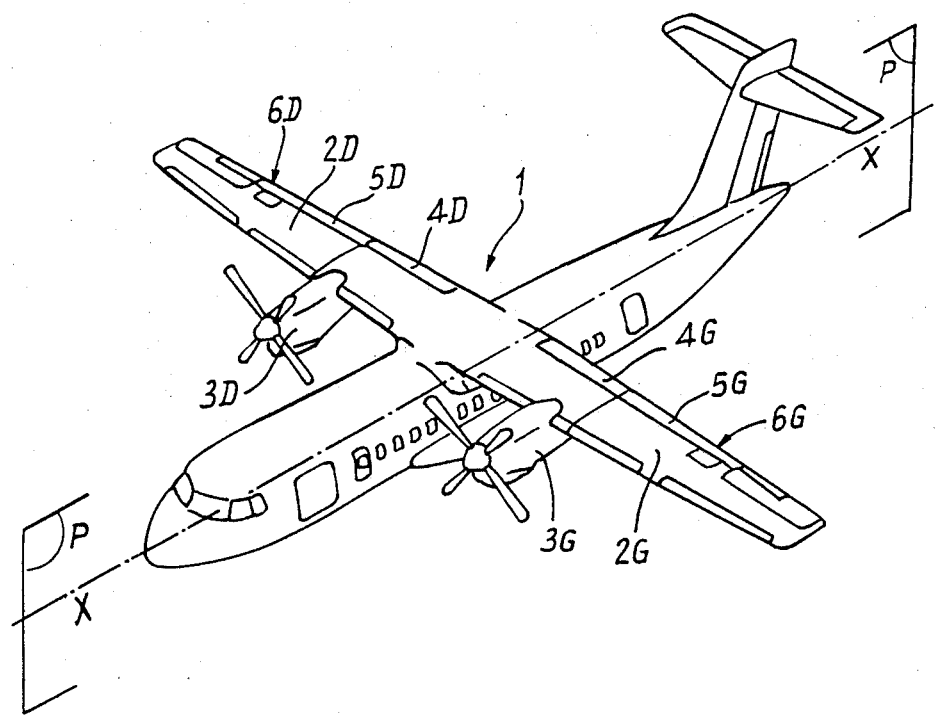

Referring now to the drawings, the aircraft 1, shown schematically in perspective in FIG. 1, presents a median longitudinal plane of symmetry P passing through its longitudinal axis X—X. This aircraft 1 comprises two fixed wings 2, identical and symmetrical to each other wit respect to said median longitudinal plane P. Each wing 2 is provided with an engine 3 for propulsion and two high-lift flaps 4 and 5, arranged in the trailing edge 6. Depending on whether elements 2 to 6 are disposed on the right-hand or left-hand side of the aircraft 1, they are given indices D or G in FIG. 1.

Engines 3 (which are shown in the form of engines with propellers, but which may equally well be jet engines), blast a jet of air onto the corresponding flaps 4 and 5. As may be seen, each flap 4 is inner with respect to outer flap 5 associated therewith and, due to the particular implantation shown for the engines, receives a greater blast than the associated outer flap 5. Of course, if the engines 3 were more spaced apart from each other, the situation might be the reverse, the outer flaps 5 in that case receiving from engines 3 a greater blast than the inner flaps 4.

Figure 2:
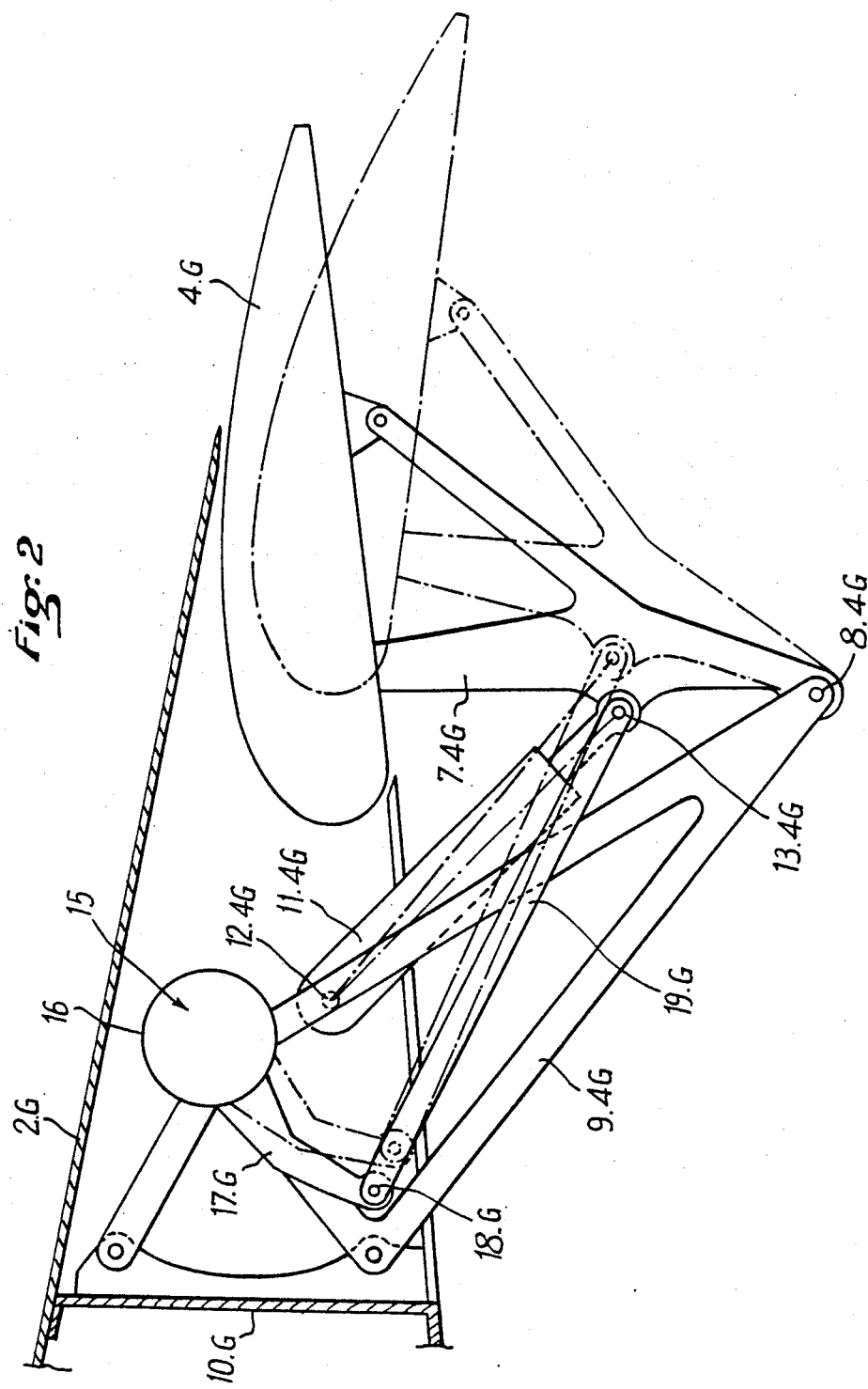
FIG. 2 shows, in side view, on the one hand, the assembly of each of the high-lift flaps of the aircraft of FIG. 1 on the corresponding wing and, on the other hand, the link between the two inner high-lift flaps of the wings of said aircraft.

FIG. 2 shows more particularly the assembly of the high-lift flap 4G on wing 2G. However, this particular assembly comprises numerous points in common with those of the other flaps 4 and 5 and makes it possible to illustrate them.

As shown in FIG. 2, each high-lift flap 4 or 5 is fast with a mount 7 adapted to pivot, in one piece with the corresponding flap, about a pin 8, disposed beneath the corresponding wing 2. To this end, the pivoting mount 7 is articulated at 8, on a descending structure 9, rigidly fixed to the rear beam 10 of said wing. A double-effect jack 11 is articulated, at its ends, on the one hand on the fixed structure 9 about pin 12, on the other hand on the pivoting mount 7 about pin 13.

When the jack 11 is totally retracted, the corresponding flap 4, 5 is thus in its retracted position (shown in solid lines in FIG. 2) for which it constitutes an aerodynamic extension of the wing 2. On the other hand, when jack 11 is extended, it may communicate to flap 4, 5 an adjustable high-lift position, such as the one shown by way of example in broken lines in FIG. 2.

Since, as mentioned above, FIG. 2 shows more particularly the assembly of the inner high-lift flap 4G, references 2, 4 and 10 are given index G, whilst references 7, 8, 9, 11–12 and 13 are given index 4G.

Figure 3:
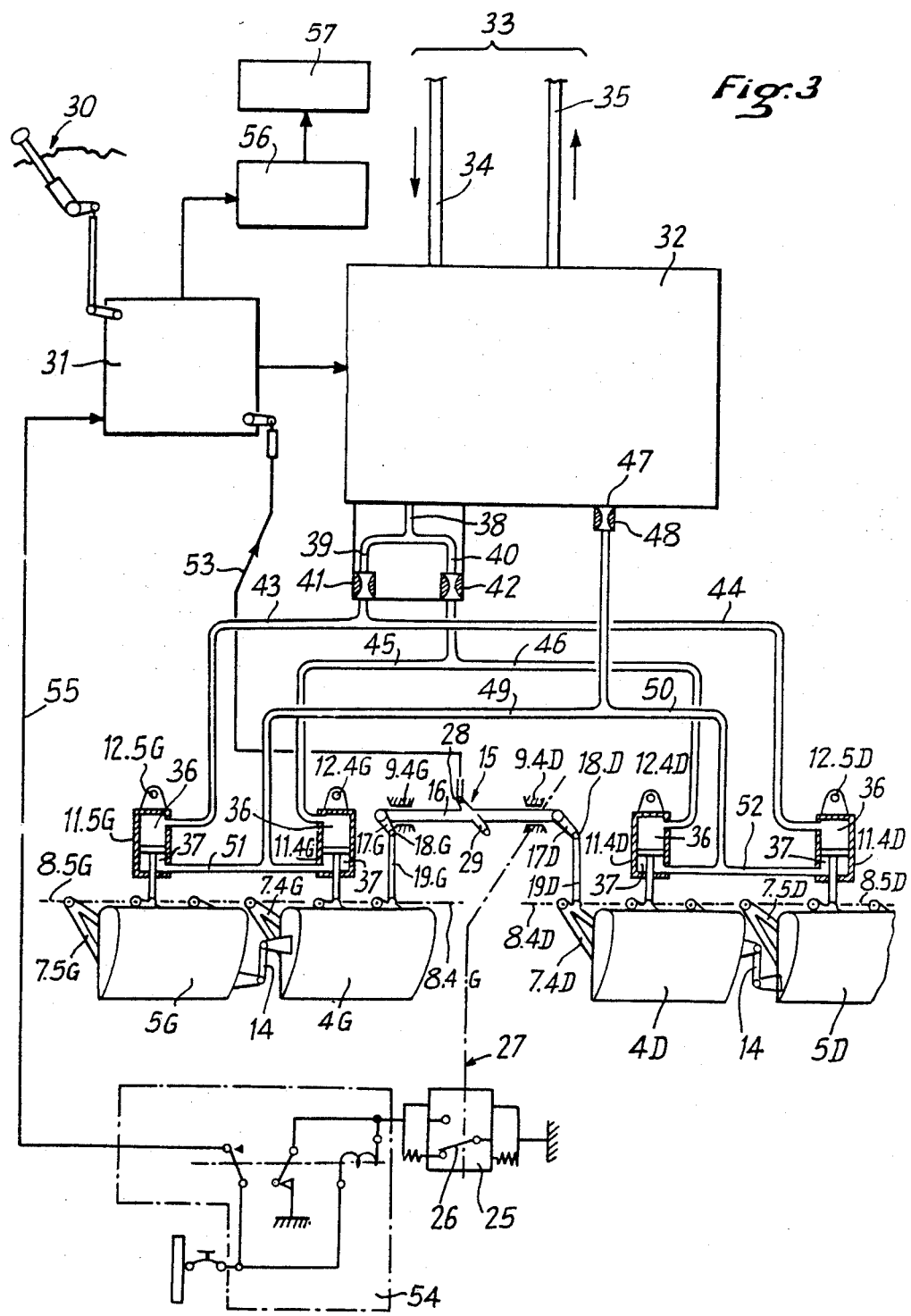
FIG. 3 is a block diagram of a first embodiment of the invention.
Figure 6:
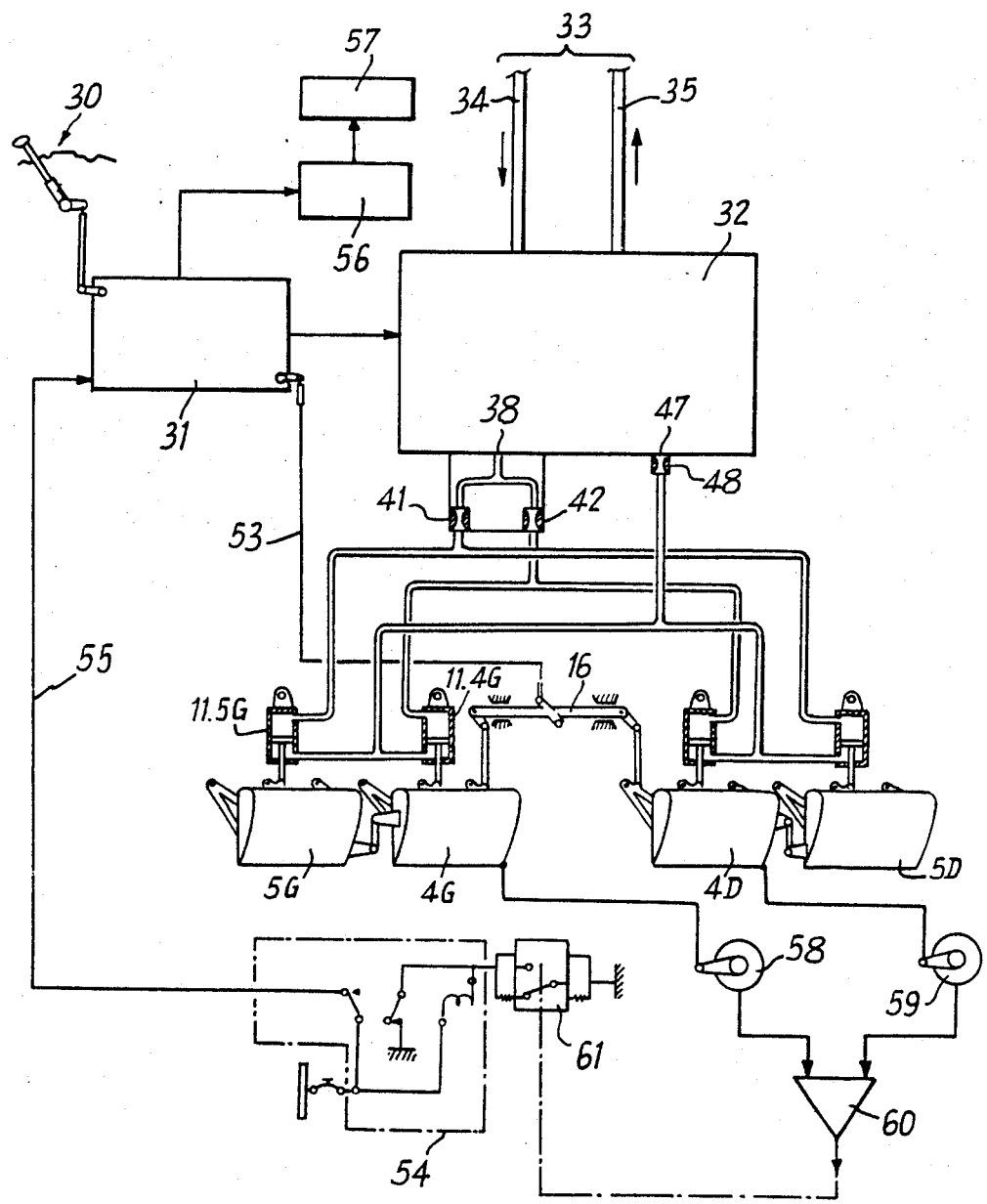
FIG. 6 is a variant embodiment of the invention, in a view similar to that of FIG. 3.

Furthermore, as shown in FIGS. 3 and 6, mechanical couplings 14 are provided between the inner flap (4G or 4D) and outer flap (5G or 5D) of each of the two pairs of flaps 4, 5. These mechanical couplings 14, intended to render fast in rotation, possibly with a predetermined clearance, the flaps 4 and 5 of each pair, may be of any known type, but are preferably in accordance with the one described in Applicants' French Patent Application No. 85 18515 filed on December 13, 1985 for "System for coupling two flaps of an aircraft wing and aircraft wing equipped with such a system".

Moreover, a torsion system 15 establishes a mechanical link between the inner high-lift flap 4G of the left wing 2G and the inner high-lift flap 4D of the right wing 2D. In the embodiment of the system 15 illustrated in FIGS. 2 to 5, it has been assumed that the pivot pins 8.4G and 8.4D of said flaps were aligned and that said torsion system 15 comprised a torque shaft or tube 16 of axis L-L parallel to said pivot pins 8.4G and 8.4D.

At each of its ends, the torque tube 16 is fast with a crankpin 17.G or 17.D, said crankpins being parallel. The left crankpin 17.G is articulated at 18.G on a connecting rod 19.G, itself articulated—for example at 13.4 G— on the pivoting mount 7.4G of the left inner high-lift flap 4.G (cf. also FIG. 2). Identically, the right crankpin 17.D is articulated at 18.D on a connecting rod 19.D, itself articulated—for example at 13.4G—on the pivoting mount 7.4D of the left inner high-lift flap 4.D.

The links of crankpins 17.G and 17.D to the pivoting mounts 7.4G and 7.4D are identical, but symmetrical with respect to said median longitudinal plane P of the aircraft 1.

Furthermore, as shown in FIG. 2, the left end of tube 16 is swivelled around axis L-L in the fixed structure 9.4G of flap 4G, whilst the right end of said tube 16 is swivelled in the same manner in the fixed structure 9.4D of flap 4D.

Inside the torque tube 16 is provided a coaxial rod 20, fast at one of its ends—for example the left end via a pin 21—with the corresponding crankpin (17G). At the other end of the rod 20—for example the right end—, there is provided a bearing 22 rendering the torque tube 16 and said rod 20 independent of each other in rotation about axis L-L.

At the latter end, the tube 16 and the rod 20 respectively comprise extensions 23 and 24 coaxial to axis L-L and enclosed in a switching box 25. Inside the extension 23 of tube 16 is mounted a microcontact 26, whilst, on the extension 24 of the rod 20 are provided two stops 27 for actuating said microcontact 26 (cf. also FIG. 5).

As may be seen, there is an angular shift A around axis L-L between the microcontact 26 and each stop 27. In this way, the microcontact 26 is actuated only when the torsion of tube 16 exceeds the angular amplitude A.

Tabs 28, 29 are provided on the torque tube 16 to allow mechanical detection of the extent of the rotation of said tube.

In known manner, the flaps 4 and 5 are controlled, from a voluntary control member 30 at a pilot's disposal, and a control device 31, by a hydraulic fluid distributing unit 32 connected to a source 33 of hydraulic fluid under pressure, via a supply line 34 and a return line 35.

In accordance with the present invention, each of the jacks 11.4G, 11.4D, 11.5G and 11.5D is of the double-effect type comprising an extension chamber 36 and a retraction chamber 37, antagonistic with respect to each other, said chambers 36 and 37 being respectively supplied with fluid under pressure depending on whether it is desired to extend or retract the flaps associated with said jacks. Moreover, said chambers are supplied in the following manner:

- a single supply orifice 38 of the hydraulic unit 32 is connected to two by-pass conduits 39 and 40, each comprising a restrictor 41 or 42. Restrictor 41 is connected, respectively by two by-pass pipes 43 and 44, to the extension chambers 36 of the two jacks 11.5G and 11.5D associated respectively with the outer flaps 5G and 5D. Restrictor 42 is connected, respectively by two by-pass pipes 45 and 46, to the extension chambers 36 of the two jacks 11.4G and 11.4D associated respectively with the inner flaps 4G and 4D;
- a single supply orifice 47 of the hydraulic unit 32 is connected to a restrictor 48. Restrictor 48 is connected, respectively by two by-pass pipes 49 and 50, to pipes 51 and 52 respectively connecting together the retraction chambers 37 of the jacks 11.4G and 11.5G associated with the left flaps 4G and 5G and the retraction chambers 37 of the jacks 11.4D and 11.5D associated with the right flaps 4D and 5D.

When the member 30 is in its position corresponding to the neutral position of flaps 4G, 4D, 5G and 5D, the retraction chambers 37 of the jacks 11.4G, 11.4D, 11.5G and 11.5D are supplied with pressurized fluid from orifice 47, through restrictor 48 and pipes 49, 50, 51 and 52. Simultaneously, the chambers 36 of said jacks are exhausted via pipes 39, 40, 43, 43, restrictors 41 and 42 and orifice 38.

If a pilot actuates the member 30 and places it in a position corresponding to a determined extended high-lift position of the flaps 4G, 4D, 5G and 5D, the control device 31 (transmitting the order received from member 30) and the hydraulic fluid distributing unit 32 exhaust chambers 37 of jacks 11.4G, 11.4D, 11.5G and 11.5D and simultaneously introduce pressurized fluid in the chambers 36 of said jacks. Consequently, flaps 4 and 5 extend simultaneously, synchronous extension being, moreover, controlled by the mechanical links 14 and by the torque system 15. During this extension, the torque tube 16 rotates, without torque, about its axis L-L, with respect to structures 9.4G and 9.4D, since the mounts 7 then move apart from said structures 9 and the movement is transmitted by connecting rods 19.G and 19.D and the crankpins 17.G and 17.D. Owing to a link 53, coming for example from tab 28, the control device 31 knows at each instant the actual rotation of said torque tube 16 and therefore the corresponding extent of the extension of said flaps 4 and 5. As soon as said flaps have attained the position of extension displayed by member 30, the control device 31 monitors the hydraulic fluid distributing unit 32 for the supply of fluid of chambers 36 and exhaust of chambers 37 to be stopped. Flaps 4 and 5 then occupy the desired extended position and receive the blast from the propellers of engines 3G and 3D.

If, in this extended position of the flaps, an engine 3 breaks down, the reduction of the blast on the failed engine side reduces the torque applied on the flaps 4 and 5 disposed to the rear, this automatically and instantaneously causing a movement of extension of said flaps. This results, in pipes 43, 44 and 45, 46, in a suction of fluid towards the flaps disposed towards the failed engine and, in pipes 49, 50, a delivery of fluid towards the flaps disposed on the side opposite the failed engine. These latter flaps therefore make a movement of retraction.

Owing to this extension of the flaps disposed towards the failed engine and to the automatic retraction of the flaps opposite this failed engine, the aircraft is subjected to a spontaneous order to roll going against the effect of the failure of the engine.

The positions of flaps 4G and 5G, on the one hand, and of flaps 4D and 5D on the other hand, no longer being identical, the tube 16 is subjected to a torque about its axis L-L, further to links 17G, 19G and 17D, 19D.

As long as this torque is less than angle A (for example equal to 9°), the microcontact 26 is not actuated. On the other hand, if the torque of tube 16 attains value A, one of the stops 27 actuates microcontact 26. The latter, for example via a relay 54, preferably self-maintained, and the link 55, cuts off supply of the control device 31, with the result that the flaps 4 remain in the relative position that they had when the value of the torque of tube 16 had attained value A.

The torque tube 16, the rod 20, the microcontact 26 and the stops 27 therefore constitute a safety system ensuring that the dissymetry between the left flaps and right flaps cannot exceed a threshold corresponding to value A. This arrangement avoids in particular the effects of an accidental failure (for example blockage of a flap or of a jack) at the same time as a manoeuvre for extension or retraction of the flaps, which might provoke a dangerous dissymetry if the order to extend or retract the flaps were maintained.

Furthermore, the system according to the invention makes it possible to delay the effects of a leakage of hydraulic fluid tending to cause flaps 4 and 5 to retract. Such a leakage, if the pilot were not warned and did not have the time to act, might have serious consequences, leading to the aircraft stalling and dropping.

If a leakage of hydraulic fluid occurs in line 43–44 (or in line 45–46), this results, on the one hand, in a drop in pressure of the hydraulic fluid in this line and, on the other hand, in an increase in pressure in the other line 45–46 (or 43–44), since the aerodynamic forces are then principally supported by the flaps supplied by the line which remains sound. Since the deteriorated line is in communication, by restrictors 41 and 42, with the sound line, fluid passes from this sound line towards the deteriorated line through said restrictors, at a speed allowed by the latter. Consequently, not only the flaps connected to the deteriorated line but also those connected to the sound line return simultaneously towards their retracted position. Moreover, such retraction occurs slowly and not suddenly.

This slow simultaneous retraction of all of the flaps is followed in rotation by the torque tube 16, which rotates about its axis L-L. Owing to link 53, the control device 31 is therefore warned that the flaps are retracting, whilst the position of lever 30 indicates that these flaps should be in extended position. This results in a discrepancy which triggers off a logic device 56 actuating an alarm 47.

The pilot is then warned of this discrepancy and, owing to the slow retraction of the flaps, due to restrictors 41 and 42, he has the time to act in order to avoid the aircraft stalling.

The function of restrictor 48, at orifice 47 of the hydraulic fluid distributing unit 32, is to create a loss of pressure, in pipes 49, 50 for retraction of the jacks, sufficient to avoid, during operations on the ground, the weight of the flaps creating a cavitation in the chambers 36 of said jacks, which would provoke operational discrepancies.

It goes without saying that the restrictors 41, 42 and 48 may be incorporated in the hydraulic unit 32. The latter, which performs simple functions, may be of any known type and has not been shown in detail. It is provided with controlled valves whose function is to obturate, when necessary, the communications with the pipes of the jacks.

An indicator (not shown) symbolizing for the pilot the present position of jacks 4 and 5, may be connected to tab 29 of the torque tube 16.

The system shown in FIG. 6 is identical to that of FIG. 3, except for the following points:

- the torque system 15 comprises only the torque tube 16 and its crankpins 17.G and 17.D; rod 20, pin 21, bearing 22, extensions 23 and 24, box 25, microcontact 26 and stops 27 are eliminated;
- on the other hand, two position sensors 58 and 59 are respectively associated with flaps 4G and 4D and furnish their measurements to a threshold comparator 60. It is this threshold comparator 60 which actuates the relay 54, via a contact 61 (acting as microcontact 25).

What is claimed is:

1. In a system for controlling the high-lift flaps of an aircraft comprising two fixed wings, symmetrical to each other with respect to the median horizontal plane of said aircraft and each provided with at least one engine for propulsion and a high-lift flap, each of said flaps being subjected to the blast of at least one engine, said control system comprising:
    a source of hydraulic fluid under pressure;
    a unit for distributing hydraulic fluid connected to said source;
    means for actuating said high-lift flaps controlled by said hydraulic fluid distributing unit;
    a device for controlling said hydraulic fluid distributing unit;
    a voluntary control member, at a pilot's disposal and controlling, via said control device, said hydraulic fluid distributing unit and said actuating means, said high-lift flaps between a retracted neutral position and at least one extended lift-augmenting position, and vice-versa,
    said actuating means are reversible hydraulic jacks, arranged so that each flap is actuated by a jack and each of the two chambers of one jack is connected to the corresponding chamber of the other jack, as well as to an orifice in said hydraulic fluid distributing unit, so that the supply and exhaust of the corresponding chambers of said jacks are respectively simultaneous;
    said high-lift flaps are connected by a mechanical torsional link allowing a dissymetry of position of said high-lift flaps in extended position; and
    means are provided for blocking said high-lift flaps in position, as soon as the dissymetry of position of said high-lift flaps in extended position attains a predetermined threshold.

2. The system of claim 1, wherein said blocking means comprise a switch controlled by the torsion of said mechanical link and controlling said device for controlling said hydraulic distributing unit.

3. The system of claim 1, wherein said blocking means comprise sensors detecting the position of said high-lift flaps, a threshold comparator and a switch controlled by said threshold comparator and controlling said device for controlling said hydraulic fluid distributing unit.

4. The system of claim 1, wherein said mechanical link comprises a torque shaft which swivels about its axis with respect to the structure of said wings and of which the ends are respectively connected to said flaps via crankpins and connecting rods.

5. The system of claim 4, wherein said torque shaft is connected to said device for controlling said hydraulic fluid distributing unit, in order to transmit to said control device information as to the rotation thereof about its axis, i.e. information on the amplitude of the extended position of said flaps.

6. The system of claim 4, wherein the mechanical link comprises, in addition, a rod coaxial to said torque shaft and fast in rotation, at one of its ends, with an end of said torque shaft, a system of stop and of contact being disposed between the free end of said rod and the opposite part of said torque shaft.

7. The system of claim 1, for an aircraft in which an additional outer high-lift flap is provided on each wing, the two flaps of one wing being connected to each other by a mechanical coupling, wherein:
    said additional outer flaps are respectively actuated by additional reversible hydraulic jacks, arranged so that:
    the chambers of these additional jacks corresponding, when they are supplied with fluid, to the retraction of said additional outer flaps, are connected in common to the corresponding chambers of the jacks associated with the inner flaps and to the first corresponding orifice of said hydraulic fluid distributing unit;
    and the chambers of said additional jacks corresponding, when they are supplied with fluid, to the extension of said additional outer flaps, are connected together and, via a first restrictor, to the second orifice of said hydraulic distributing unit, to which are connected the corresponding chambers of the jacks actuating the inner flaps;

and a second restrictor is provided between said second orifice of said hydraulic distributing unit and the corresponding chambers of the jacks associated with the inner flaps.

8. The system of claim 5, wherein it comprises an alarm device triggered off by said control device, when said voluntary control member is in a position corresponding to the extension of said high-lift flaps, whilst rotation of said torque shaft indicates retraction of the latter.

* * * * *